US009641265B2

(12) United States Patent
Rumpunen et al.

(10) Patent No.: US 9,641,265 B2
(45) Date of Patent: May 2, 2017

(54) USE OF AN APPARATUS FOR IMPROVING SIGNAL TO NOISE RATIO

(71) Applicant: Teleste Oyj, Littoinen (FI)

(72) Inventors: Toni Rumpunen, Raisio (FI); Perttu Fagerlund, Turku (FI); Tommi Ketola, Turku (FI); Sami Halen, Kaarina (FI); Pekka Hilke, Turku (FI)

(73) Assignee: TELESTE OYJ, Littoinen (FI)

( * ) Notice: Subject to any disclaimer, the term of this patent is extended or adjusted under 35 U.S.C. 154(b) by 0 days.

(21) Appl. No.: 14/934,537

(22) Filed: Nov. 6, 2015

(65) Prior Publication Data

US 2016/0134384 A1 May 12, 2016

(30) Foreign Application Priority Data

Nov. 7, 2014  (EP) ..................................... 14397532

(51) Int. Cl.
| | |
|---|---|
| *H04B 3/48* | (2015.01) |
| *H04B 17/318* | (2015.01) |
| *H04N 7/10* | (2006.01) |
| *H04N 7/173* | (2011.01) |
| *H04N 21/61* | (2011.01) |
| *H04L 12/24* | (2006.01) |

(52) U.S. Cl.
CPC .............. *H04B 17/318* (2015.01); *H04B 3/48* (2013.01); *H04N 7/102* (2013.01); *H04N 7/17318* (2013.01); *H04N 21/6118* (2013.01); *H04N 21/6168* (2013.01); *H04L 41/0853* (2013.01)

(58) Field of Classification Search
CPC ........... H04B 10/2575; H04N 21/6118; H04N 21/6168; H04L 41/0853
See application file for complete search history.

(56) References Cited

U.S. PATENT DOCUMENTS

| | | | |
|---|---|---|---|
| 7,089,580 B1 | 8/2006 | Vogel et al. | |
| 2013/0165132 A1* | 6/2013 | Goedken | H04W 52/243 455/450 |
| 2014/0282783 A1* | 9/2014 | Totten | H04L 12/2885 725/111 |

OTHER PUBLICATIONS

European Search Report for EP Application No. 14397532.4 dated Apr. 29, 2015, 5 pages.
Jordanova et al., "Improvement of the CATV Coaxial Distribution System Parameters", International Journal of Computer Science and Network Security, vol. 12, No. 5, May 2012, pp. 123-130.

* cited by examiner

*Primary Examiner* — Ross Varndell
(74) *Attorney, Agent, or Firm* — Hollingsworth Davis, LLC (57) ABSTRACT

The invention relates to a use of an apparatus for improving signal to noise ratio in a cable modem system. The apparatus comprises a processor, an attenuator and a cable modem termination system unit for providing access to a communication network.

7 Claims, 8 Drawing Sheets

USE OF AN APPARATUS FOR IMPROVING SIGNAL TO NOISE RATIO

TECHNICAL FIELD

The present disclosure relates generally to cable modem systems, and more specifically, to a use of an apparatus for improving signal to noise ratio in a cable modem system. Moreover, the present disclosure relates to a method for improving signal to noise ratio in cable modem systems.

BACKGROUND

Today, cable modem systems are widely used to provide an Internet connection in buildings, where Hybrid Fibre Coax (HFC) cables are already in place for cable television. A cable modem system employs a Cable Modem Termination System (CMTS) to provide the Internet connection to a plurality of cable modems.

Configuring the CMTS and other devices such as amplifiers, optical receivers etc. in the cable television networks, for example, during an installation phase or at a later time when changes take place in a setup of the cable modem system, is typically a manual process, and therefore, is prone to human errors. Thus, installation and configuration of the CMTS and other devices requires expertise.

Typically, a person installing and/or configuring the CMTS and other related devices has to perform one or more measurements in a cable television network to adjust signal levels in order to have signal to noise (S/N) ratio at an adequate level. S/N of the cable television network tends to also change over time due to changes in the network topology (more devices, broken connections, poor connections), environment (such as temperature, humidity, other devices causing interference). This leads to a need to re-adjust or configure the network from time to time.

SUMMARY

The present disclosure seeks to provide a use of an apparatus for improving signal to noise ratio in a cable modem system. The apparatus comprises a processor, an attenuator and a cable modem termination system unit for providing access to a communication network.

Moreover, the present disclosure seeks to provide a method for improving signal to noise ratio in a cable modem system, via an apparatus, the method comprising:

(a) determining one or more transmit level margins;
(b) selecting one of the transmit level margins;
(c) using the selected transmit level margin to derive an attenuation value; and
(d) adjusting an attenuator of the apparatus, by the attenuation value, to attenuate a signal received by the apparatus.

DETAILED DESCRIPTION OF THE INVENTION

The following detailed description illustrates embodiments of the present disclosure and ways in which they can be implemented.

The present disclosure seeks to provide a use of an apparatus for improving signal to noise ratio in a cable modem system. The apparatus comprises a processor, an attenuator and a cable modem termination system unit for providing access to a communication network. Additionally the apparatus may comprise a cable television signal input interface for receiving one or more cable television signals and optionally a spectrum analyser for analysing a spectrum of signals.

Embodiments of the present disclosure substantially eliminate or at least partially address the aforementioned problems in the prior art, and to improve signal to noise ratio in cable modem systems.

Optionally the use of the apparatus further comprises determining one or more transmit level margins, selecting one of the transmit level margins and using the selected transmit level margin to derive an attenuation value to adjust the attenuator of the apparatus to attenuate a signal received by the apparatus. The apparatus may thus comprise a memory coupled to the processor of the apparatus. The memory is used for storing a first computer-readable program code that, when executed on the processor, is configured to determine one or more transmit level margins, select one of the transmit level margins and use the selected transmit level margin to derive an attenuation value to adjust the attenuator of the apparatus to attenuate a signal received by the apparatus.

Optionally the apparatus is used by conforming to Data Over Cable Service Interface Specification.

Moreover, the present disclosure seeks to provide a method for improving signal to noise ratio in a cable modem system, via an apparatus, the method comprising:

(a) determining one or more transmit level margins;
(b) selecting one of the transmit level margins;
(c) using the selected transmit level margin to derive an attenuation value; and
(d) adjusting an attenuator of the apparatus, by the attenuation value, to attenuate a signal received by the apparatus.

A cable modem system setup/configuration typically starts with a registration phase. During the registration phase a set of parameters of each cable modems i=1 . . . N can be collected by the apparatus via a cable modem network segment. One of the parameters is a potential maximum transmit level ($TxLMax_i$) of a cable modem i. This way, the apparatus obtains information of a maximum signal power that is expected from at least one of the cable modems.

Further cable modems are configured with the apparatus so that an upstream input level for each of the cable modems i=1 ... N is substantially similar to each other. For example, the input level target could be set to TxT=70 dBuV (decibel micro volt). In practice this can be done by requesting each of the cable modems i=1 ... N to increase or decrease the transmit level ($TxL_i$) or to set the transmit level to a certain value one by one. An example of such request is a command sent by the cable modem termination unit via cable modem network segment to cable modems according to a relevant standard or protocol.

Further the apparatus sends a request to cable modems (i=1 ... N) to communicate the current transmit level ($TxL_i$) of each of the modem i to the apparatus. The received current transmit levels are used to determine, for each of the cable modem i, a transmit level margin ($TxM_i$). The transmit level margin can be calculated as $TxM_i=TxLMax_i-TxL_i$.

As an example, the transmit level margins $TxM_i$ are analysed to find the smallest transmit level margin $TxM_{min}$.

Further the apparatus adjusts the Signal-to-Noise ratio (S/N) automatically by adjusting an attenuation of the attenuator. As an example, the attenuator is adjusted with a command from the processor of the apparatus. The attenuator might be adjusted to attenuate with a value equal to $TxM_{min}$. This leads to a decrease in the input level of the upstream signal by $TxM_{min}$. Optionally, the attenuator might be adjusted to attenuate with an attenuation value between 50% and 200% of the selected transmit level margin. Optionally, the attenuator might be adjusted to attenuate with an attenuation value between 80% and 150% of the selected transmit level margin. Optionally, the attenuator might be adjusted to attenuate with attenuation value between 90% and 110% of the selected transmit level margin.

Optionally, the apparatus re-configures cable modems i so that an upstream input level from each cable modem to the apparatus is substantially similar to each other. In practice this can be done by requesting a cable modem to increase or decrease the transmit level ($TxL_i$) or to set the transmit level to certain level. The attenuator may also be adjusted automatically.

Optionally, according to the method the transmit level margin is determined by comparing a potential maximum transmit level of a modem with a current transmit level of the modem.

Optionally according to the method the selected transmit level margin is selected from a group consisting of at least two transmit level margins.

Optionally, according to the method the selected transmit level margin is the smallest transmit level margin determined.

The Signal-to-Noise ratio (S/N) is defined as a ratio of a power of a signal to a power of a noise. The S/N is a measure of how many times the power of the signal is greater than the power of the noise. The S/N is usually expressed in decibels (dB).

Moreover, optionally, the apparatus also includes a programmable controllable switch for switching ON/OFF the one or more cable television signals. This can be used to turn of cable television program signals during the configuration of one of the communication related parameters affecting S/N ration.

An example of an environment that is suitable for practicing embodiments of the present disclosure is an environment including a cable television (CATV) system, a communication network, one or more apparatus (es) for configuring communication-related parameters according to this description, a cable television (CATV) network segment, a plurality of cable modems, a plurality of television (TV) sets, and a plurality of computing devices. The CATV network segment includes cables for connectivity, passive and active radio frequency components wall outlets, splitters, tappers etc.

The present apparatus may be connected to the CATV system, for example, via a digital/analogue interface. The apparatus is operable to receive one or more CATV signals broadcasted by the CATV system.

The apparatus may be connected to the communication network, for example, via a network interface. The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), and Wireless MANs (WMANs). An example of the communication network is the Internet.

Optionally, the environment also includes one or more servers that are accessible via the communication network. The server may, for example, be running a web service that may be accessed by users associated with the computing devices.

Optionally, the apparatus is operable to receive data packets from the server, via the communication network. Optionally, the apparatus is operable to convert the data packets into data signals that are suitable for transmission over Hybrid Fibre Coax (HFC) cables.

According to an embodiment, the apparatus is connected to a cable television network segment (with elements such as splitters, cables, tappers), which provides a connection to cable modems. Computing devices such as computers, tablet computers, game consoles, smart phones or smart televisions are connected to the cable modem in order to get a data connection. The apparatus is further connected to a communication network such as Internet. The CMTS unit of the apparatus is used to facilitate Internet data connection between the communication network and the cable modems connected to the CATV network segment. Further, the television signal is received from the CATV network and is fed via the apparatus to the CATV network segment. The television sets can be connected to CATV the network segment for providing television services.

The cable modems can be also connected to their respective TV sets, and to their respective computing devices of the TV sets. Connections between TV sets and the cable modems can be provided by coaxial cables or HFC cables or as wired or wireless data connection. The connections between the cable modems and their respective computing devices can thus be either wired or wireless. Further there might be communication devices such as routers between the cable modems and the computing devices.

In a downstream path from the apparatus to the cable modem, the CATV network segment may receive signals from the present apparatus, and feed these signals to the cable modems via HFC or coaxial cable or similar connectivity. Optionally, in the downstream path, the signals include the one or more CATV signals and/or one or more data signals pertaining to data downloaded via the communication network. A frequency range of 50 MHz to 1000 MHz might be used for the downstream path communication.

Upon receiving the one or more CATV signals from the present apparatus, the cable modems may provide their respective TV sets with TV-related information, either directly or via a TV decoder box. This enables the TV sets to provide their users with TV content for viewing. In an example setup, the cable modem is used only for the data connection. The data connection can be for example an Internet Protocol connection. Television related information can be derived from the information in a cable television signal of each television channel or channel bundle. An example of such information might be a Digital Video Broadcasting for cable television (DVB-C) channel guide.

Likewise, upon receiving the one or more data signals from the present apparatus, the cable modems can provide their respective computing devices with data downloaded, for example via the communication network, by their respective computing devices.

In an upstream path from cable model to the apparatus, the cable television network segment combines signals from the cable modems, and feeds these signals to the apparatus. Optionally, in the upstream path, the signal(s) include one or more data signals pertaining to data uploaded by at least one of the computing devices.

Examples of the computing devices include, but are not limited to, smart telephones, Mobile Internet Devices (MID's), tablet computers, Ultra-Mobile Personal Computers (UMPC's), phablet computers, Personal Digital Assistants (PDA's), web pads, laptops, Personal Computers (PC's), handheld PC's, and Internet Protocol (IP) TV receivers.

In an example, the environment could be implemented in a hotel TV and Internet system. In this example, a plurality of cable modems could be installed in a plurality of hotel rooms.

In a second example, the environment could be implemented in a TV and Internet system for households with a plurality of apartments within a building.

In the second example, a plurality of cable modems, such as the cable modems, could be installed in the plurality of apartments. Most typically, there is one cable modem per room.

In another example, the environment could be implemented in a TV and Internet system for households with a plurality of apartments within a building. In this example, a plurality of cable modems could be installed in the plurality of apartments. Most typically, there is one cable modem per apartment.

The CMTS (cable modem termination system) unit of the present description may comprise a CMTS downstream unit and a CMTS upstream unit. Additionally, optionally, the apparatus of the present description comprises also a combiner, a diplex filter (also known as a diplexer), an attenuator, and one or more amplifiers. The memory, the spectrum analyser, the CMTS unit and the programmable controllable switch (when used) can be coupled to the processor.

According to one embodiment, the CATV signal input interface receives one or more CATV signals from a CATV system. The one or more CATV signals are then amplified by the amplifier, and fed to the spectrum analyser. The CMTS unit can be operable to receive data packets, via a communication network. Optionally, the CMTS downstream unit is operable to convert the data packets into downstream data signals that are suitable for transmission over HFC cables within the CATV network segment. The CMTS downstream unit is then operable to transmit the downstream data signals to the amplifier, which amplifies the downstream data signals and feeds the amplified data signals to the combiner.

The combiner combines the amplified data signals to the one or more CATV signals to produce combined signals. The combiner then feeds these combined signals to the amplifier and the amplifier then amplifies the combined signals and feeds them through the diplexer for transmission to the cable modem system, namely, one or more cable modems that are communicably coupled to the apparatus, for example, via a cable television network segment.

Moreover, the CMTS upstream unit can be operable to receive one or more upstream data signals from the one or more cable modems, via a diplexer and an attenuator. The diplexer enables bi-directional communication, namely transmission of downstream and upstream data signals, over a single HFC cable. The attenuator attenuates the one or more upstream data signals, and feeds the attenuated data signals to the CMTS upstream unit.

The CMTS upstream unit is then, in this embodiment, operable to convert these data signals into data packets that are suitable for transmission over the communication network. The data packets include, but are not limited to, Internet Protocol (IP) packets. Subsequently, the CMTS unit is operable to transmit the data packets across the communication network.

Moreover, optionally, the processor is operable to use communication capabilities of the CMTS unit to communicate with one or more servers over the communication network. In an example, the processor is operable to receive information, for example, including software updates and/or settings over the communication network.

Additionally or alternatively, optionally, the processor is operable to use communication capabilities of the CMTS unit to communicate with the one or more cable modems, as will be elucidated below.

Optionally, the memory stores a second computer-readable program code that, when executed on the processor, is configured to send a request to at least one of the one or more cable modems, via the CMTS downstream unit, to measure a signal strength of a signal received by the at least one of the one or more cable modems. The second computer-readable program code, when executed on the processor can be configured to receive one or more signal strength measurements from the at least one of the one or more cable modems, via the CMTS upstream unit.

Moreover, optionally, the second computer-readable program code, when executed on the processor, is configured to adjust the one or more communication-related parameters to be used for communication with the at least one of the one or more cable modems, namely, for communication between the CMTS unit and the at least one of the one or more cable modems.

The first computer-readable program code and the second computer-readable program code can be separate programs running in the apparatus or they can be combined to run as a single program.

Optionally, the processor controls at least one of the amplifiers or adjustable attenuators to adjust at least one of the one or more communication-related parameters for downstream signals. Optionally, the processor controls the attenuator to adjust at least one of the one or more communication-related parameters for upstream signals.

Optionally, the memory stores at least one of: the one or more signal strength measurements, configurations of the one or more communication-related parameters, and/or other software associated with the cable modem system.

Moreover, optionally, the apparatus includes a switch. The switch can be programmed and controlled by the processor to switch OFF the one or more CATV signals received from the CATV system, during the configuration of the cable modem system and adjusting amplifiers. The switch can refer to a processor controllable radio frequency (RF) switch which can be used to turn RF signal ON or OFF.

Further, optionally, the switch is programmed and controlled by the processor to switch OFF the one or more CATV signals received from the CATV system, during the measurement of downstream signal strengths from the cable modems connected to CATV network segment.

Moreover, optionally, the switch is controlled by the processor to switch OFF the one or more CATV signals received from the CATV system, during the analysis of the spectrum by the spectrum analyser.

Moreover, optionally, the spectrum analyser is operable to analyse a spectrum of signals that is incoming from the CATV signal input interface.

Optionally, in an alternative implementation, an optical receiver of the apparatus is controlled by the processor to switch OFF the one or more CATV signals, during the analysis of the spectrum.

Optionally, the spectrum analyser and/or the processor are operable to determine one or more free frequency bands that are unallocated in the spectrum, based upon the analysis of the spectrum.

Embodiments of the present disclosure are susceptible to being used for various purposes, including, though not limited to, facilitating an automatic configuration of communication-related parameters in cable modem systems.

An embodiment of the present disclosure also provides a computer program product comprising a non-transitory computer-readable data storage medium having stored thereon computer-readable program code, which is executable by a processor of an apparatus to implement the method as described above.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

Figure 1:
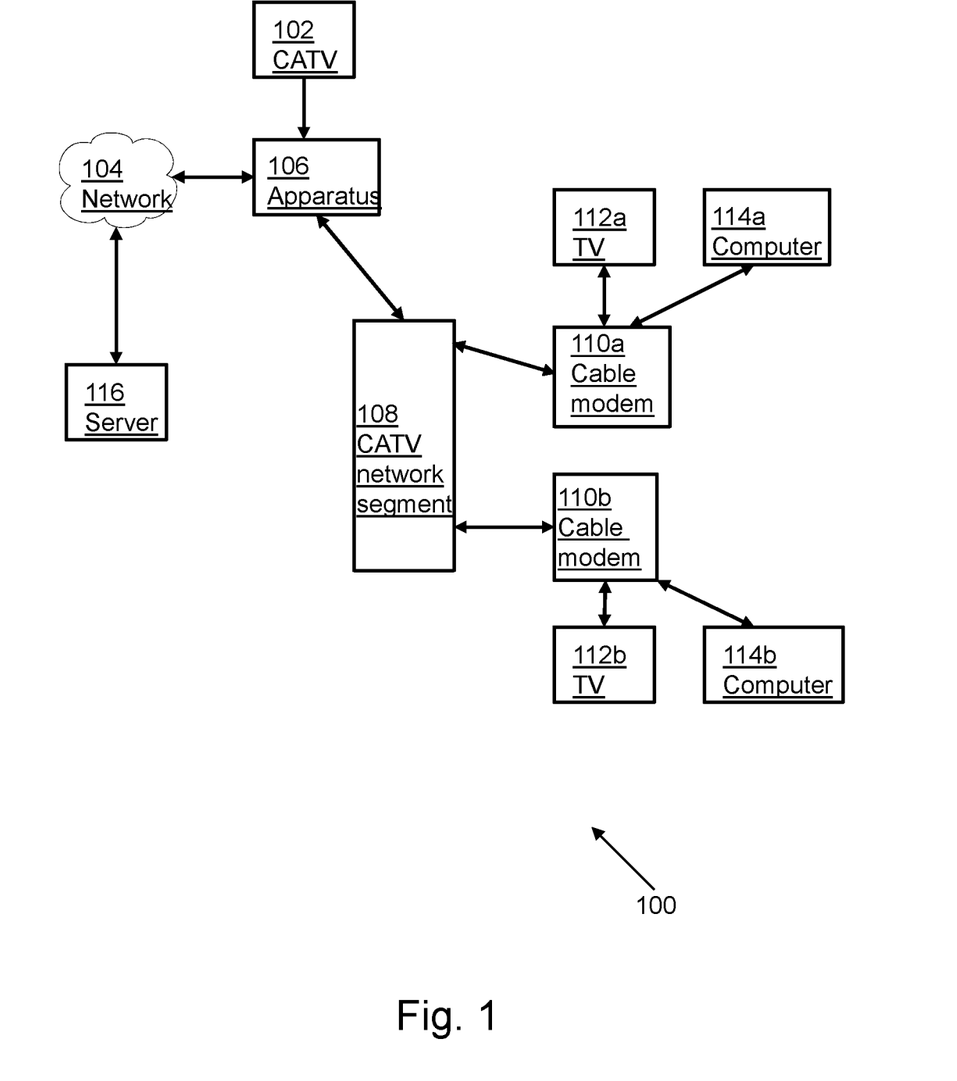
FIG. 1 is a schematic illustration of an example environment that is suitable for practicing embodiments of the present disclosure.

Embodiments of the present disclosure will now be described, by way of example only, with reference to the following diagrams wherein FIG. 1 is a schematic illustration of an example environment 100 that is suitable for practicing embodiments of the present disclosure. The environment 100 includes a cable television (CATV) system 102, a communication network 104, one apparatus 106 for configuring communication-related parameters, a cable television (CATV) network segment 108, a plurality of cable modems, depicted as a cable modem 110a and a cable modem 110b in FIG. 1 (hereinafter collectively referred to as cable modems 110), a plurality of television (TV) sets, depicted as a TV set 112a and a TV set 112b in FIG. 1 (hereinafter collectively referred to as TV sets 112), a plurality of computing devices, depicted as a computing device 114a and a computing device 114b in FIG. 1 (hereinafter collectively referred to as computing devices 114).

The apparatus 106 is connected to the CATV system 102 via a digital/analogue interface and it is operable to receive one or more CATV signals broadcasted by the CATV system 102. The apparatus 106 is connected to the communication network 104 via a network interface. The environment 100 also includes one server 116 that is accessible via the communication network 104. The apparatus 106 is connected to the CATV network segment 108, which is connected to the cable modems 110. The cable modems 110 are connected to their respective TV sets 112, and to their respective computing devices 114. In a downstream path, the CATV network segment 108 receives signals from the apparatus 106, and feeds these signals to the cable modems 110.

Upon receiving the one or more CATV signals from the apparatus 106, the cable modems 110 provide their respective TV sets 112 with TV-related information, either directly or via a TV decoder box. This enables the TV sets 112 to provide their users with TV content for viewing. Likewise, upon receiving the one or more data signals from the apparatus 106, the cable modems 110 provide their respective computing devices 114 with data downloaded, via the communication network 104, by their respective computing devices 114.

In an upstream path, the CATV network segment 108 receives signals from the cable modems 110, and feeds these signals to the apparatus 106.

FIG. 1 is merely an example, which should not unduly limit the scope of the claims herein. It is to be understood that the specific designation for the environment 100 is provided as an example and is not to be construed as limiting the environment 100 to specific numbers, types, or arrangements of CATV systems, apparatus, CATV network segment, cable modems, TV sets, computing devices, servers, and communication networks. A person skilled in the art will recognize many variations, alternatives, and modifications of embodiments of the present disclosure.

Figure 2:
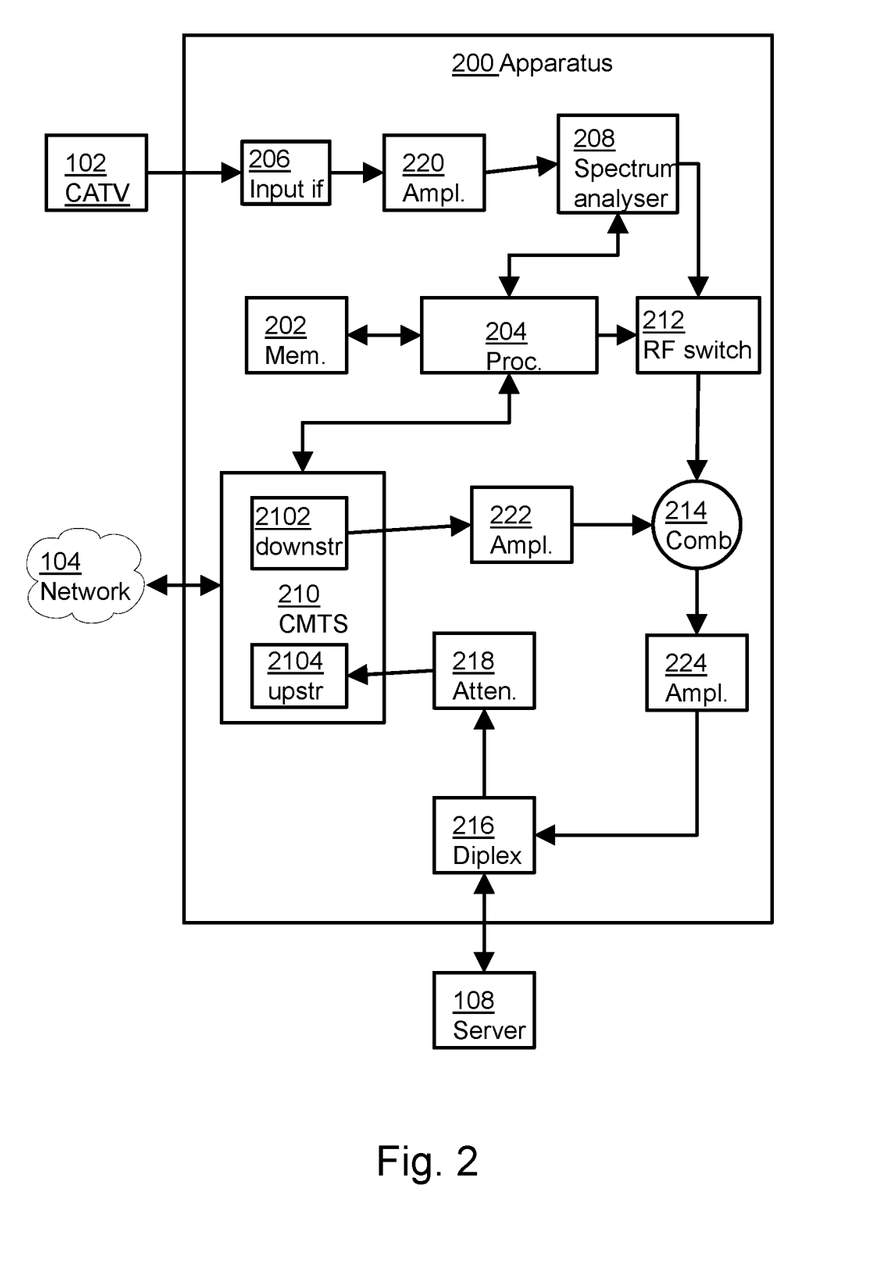
FIG. 2 is a schematic illustration of an apparatus for configuring one or more communication-related parameters in a cable modem system, in accordance with an embodiment of the present disclosure.

FIG. 2 is a schematic illustration of an apparatus 200 for configuring one or more communication-related parameters in a cable modem system, in accordance with an embodiment of the present disclosure.

The apparatus 200 includes a memory 202, a processor 204, a CATV signal input interface 206 in connection with a CATV system 102, a spectrum analyser 208, and a Cable Modem Termination System (CMTS) unit 210. The apparatus 200 also includes a programmable controllable RF (radio frequency) switch 212.

The CMTS unit 210 includes a CMTS downstream unit 2102 and a CMTS upstream unit 2104 and it is in connection with a communication network 104.

The apparatus 200 also includes a combiner 214, a diplex filter 216 which is communicably coupled to the present apparatus via a CATV network segment 108, an attenuator 218, and one or more amplifiers, depicted as an amplifier 220, an amplifier 222 and an amplifier 224.

The memory 202, the spectrum analyser 208, the CMTS unit 210 and the programmable controllable RF switch 212 are controllable by the processor 204.

FIG. 2 is merely an example, which should not unduly limit the scope of the claims herein. A person skilled in the art will recognize many variations, alternatives, and modifications of embodiments of the present disclosure.

Figure 3A:
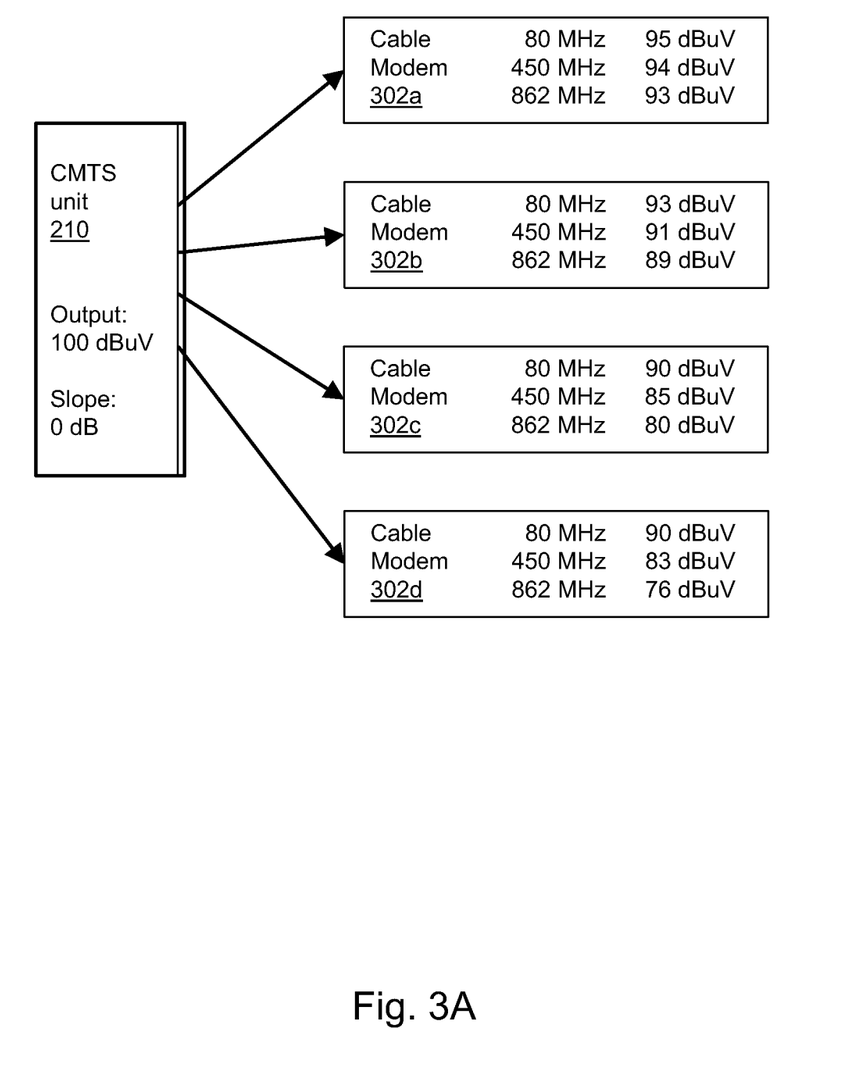
FIGS. 3A and 3B are illustrations of an example setup, before one or more communication-related parameters are configured for downstream signals, in accordance with an embodiment of the present disclosure.
Figure 3B:
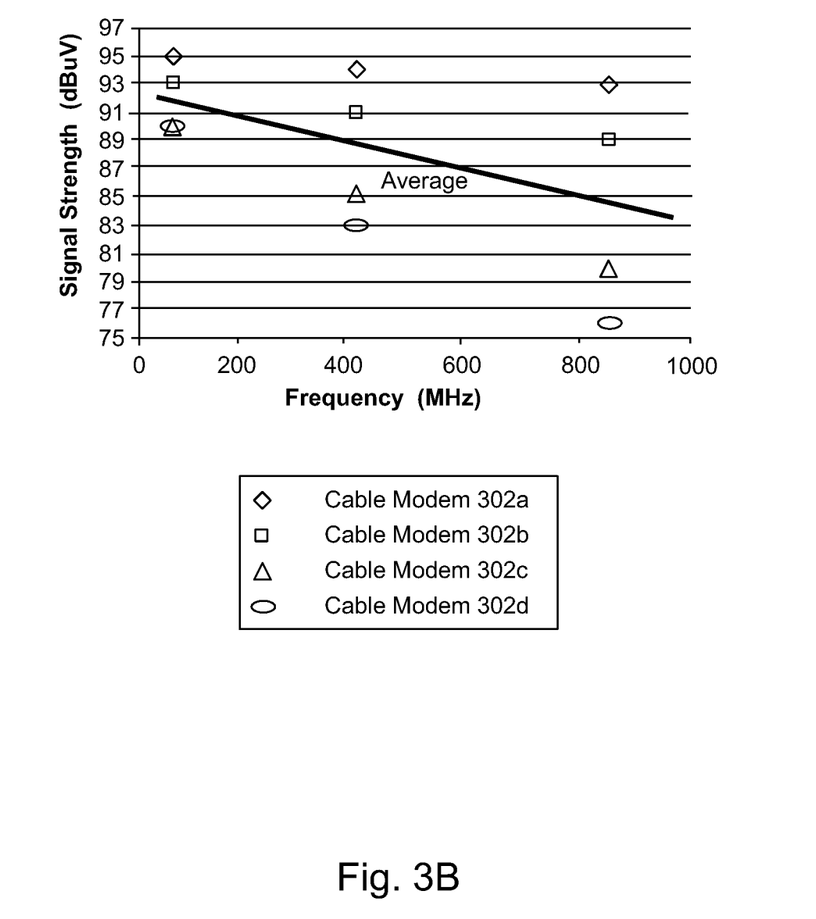

FIGS. 3A and 3B are illustrations of an example setup, before one or more communication-related parameters are configured for downstream signals, in accordance with an embodiment of the present disclosure. With reference to FIG. 3A, the CMTS unit 210 of the apparatus 200 is communicably coupled to four cable modems, namely, cable modems 302a, 302b, 302c and 302d (hereinafter collectively referred to as cable modems 302).

In the example setup, the CMTS unit 210 sends a request to the cable modems 302 to measure signal strengths of signals received at frequencies 80 MHz, 450 MHz and 862 MHz.

Initially, an output signal level of the apparatus 200 is set to 100 dBuV, and a slope is set to zero dB (0 dB).

FIGS. 3A and 3B show signal strength measurements taken by the cable modems 302, in tabular and graphical forms, respectively.

As described earlier, the apparatus 200 is operable to adjust the gain and the slope automatically, based on the signal strength measurements taken by the cable modems 302.

For illustration purposes only, there will now be considered an example where a desired input level for the cable modems 302 is 95 dBuV, and a frequency response is substantially flat for all frequencies. Consequently, the gain is adjusted to be +3 dB, and the slope is adjusted to be +9 dB.

Figure 4A:
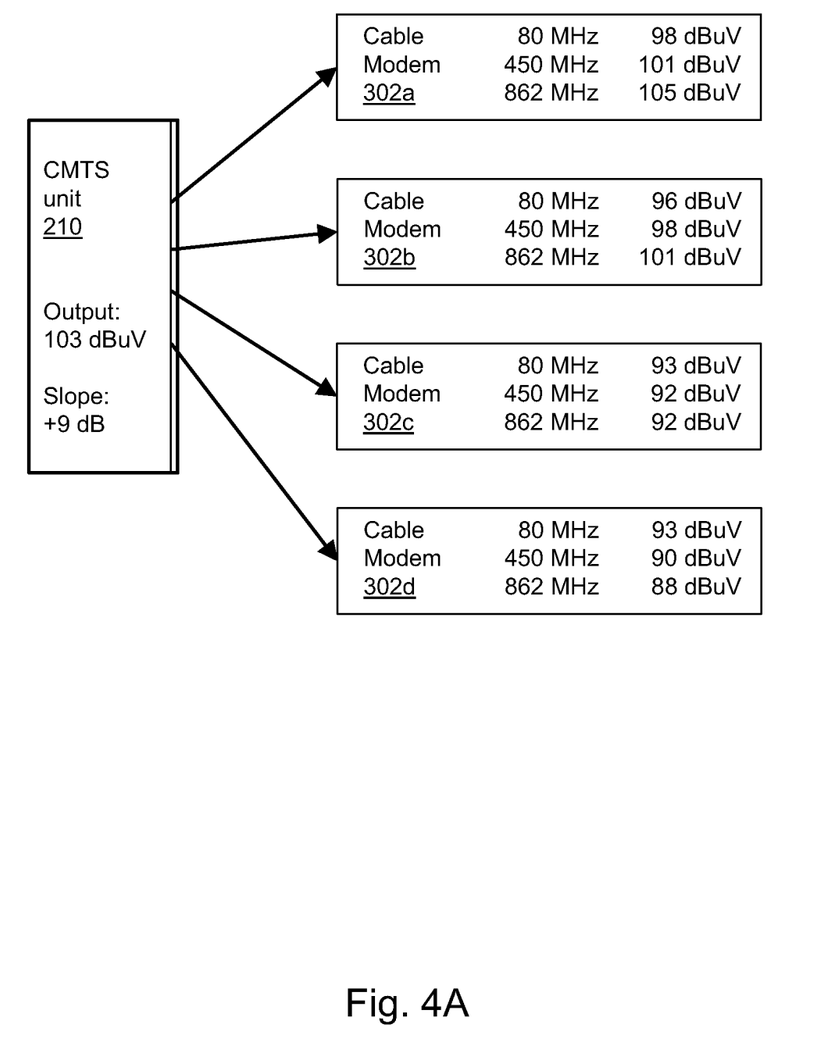
FIGS. 4A and 4B are illustrations of the example setup, after the one or more communication-related parameters are configured for the downstream signals, in accordance with an embodiment of the present disclosure.
Figure 4B:
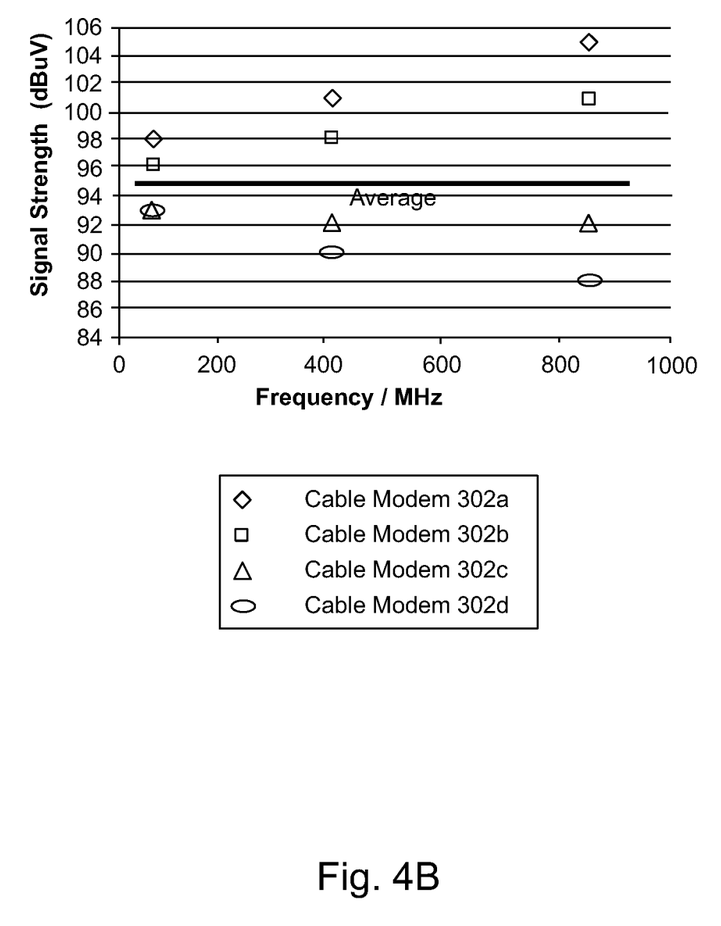

FIGS. 4A and 4B are illustrations of the example setup, after the one or more communication-related parameters are configured for the downstream signals, in accordance with an embodiment of the present disclosure. FIGS. 4A and 4B show signal strength measurements taken by the cable modems 302, in tabular and graphical forms, respectively. These signal strength measurements are taken after the gain and the slope are adjusted automatically by the apparatus 200.

Figure 5A:
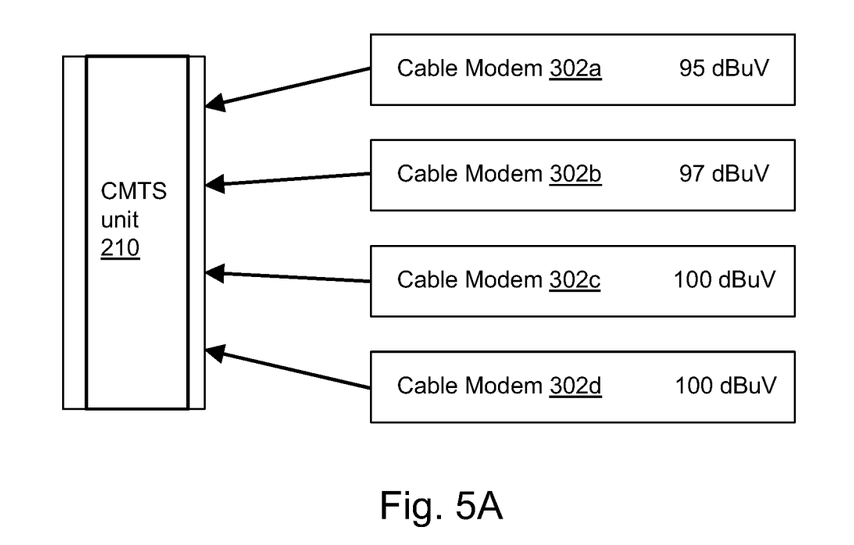
FIGS. 5A and 5B are illustrations of an example setup, before and after one or more communication-related parameters are configured for upstream signals, respectively, in accordance with an embodiment of the present disclosure.
Figure 5B:
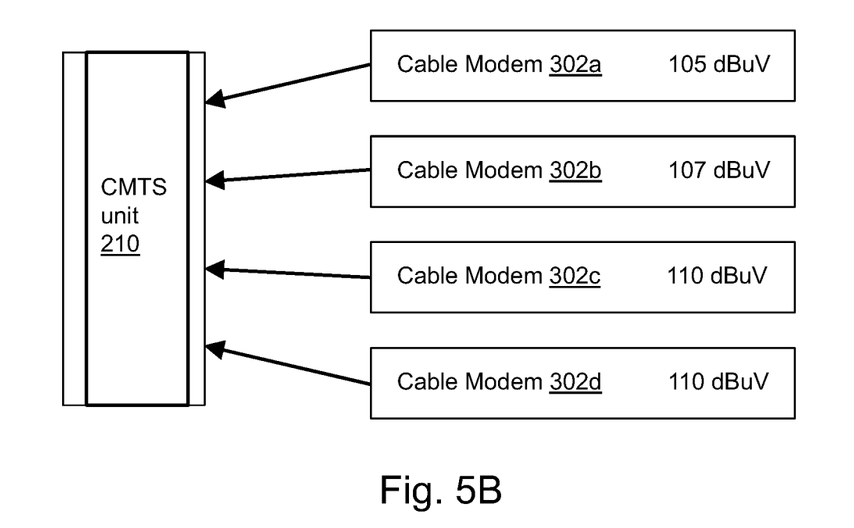

FIGS. 5A and 5B are illustrations of the example setup, before and after one or more communication-related parameters are configured for upstream signals, respectively, in accordance with an embodiment of the present disclosure.

Below is an example of steps for adjusting communication parameters to improve the signal to noise (S/N) ration of a cable modem system related to FIGS. 5A and 5B:

Step 1: Cable modem system setup/configuration starts with a registration phase, during which a set of parameters of each cable modem 302a-302d (i=1, 2, 3, 4 for 302a, 302b, 302c and 302d respectively) are collected by the CMTS unit 210. One of the parameters is a potential maximum transmit level (TxLMax$_i$) of a cable modem i. This way the apparatus 200 obtains information of a maximum signal power that is expected from at least one of the cable modems 302. In the present example, a maximum transmit level of a modem i is 110 dBuV (decibel micro volts). In the present example, the maximum transmit level is same for all of the modems i=1, 2, 3, 4.

Step 2: The CMTS unit 210 configures cable modems so that the CMTS unit 210 input level from each of the cable modems i=1 . . . 4 is substantially similar to each other. For example, the input level target is set to TxT=70 dBuV.

Step 3: The CMTS unit 210 sends a request to first cable modem (i=1) to communicate the current transmission level (TxL$_i$) of the modem 1. This step is repeated to all cable modems that are connected to the apparatus. FIG. 5A is an illustration of the current transmission levels TxL$_i$ for the cable modems 302 in a tabular form. The measured transmission levels in the present example for modems 302a-d are TxL$_1$=95 dBuV, TxL$_2$=97 dBuV, TxL$_3$=100 dBuV, TxL$_4$=100 dBuV, respectively.

Step 4: For each of the cable modem i, a transmit level margin (TxM$_i$) is calculated as TxM$_i$=TxLMax$_i$-TxL$_i$. The calculated transmit level margins in the present example for modems 302a-d are TxM$_1$=15 dBuV, TxM$_2$=13 dBuV, TxM$_3$=10 dBuV, TxM$_4$=10 dBuV, respectively.

Step 5: TxM$_i$ are analysed to find the smallest transmit level margin TxM$_{min}$ In the present example the smallest transmit level margin TxM$_{min}$=10 dBuV.

Step 6: The apparatus 200 adjusts the Signal-to-Noise ratio (S/N) automatically by adjusting an attenuation of the attenuator 218 automatically. The attenuator 218 is adjusted to attenuate with TxM$_{min}$=10 dBuV. This leads to decrease in the input level of the CMTS unit 210 by 10 dBuV.

Step 7: The CMTS unit 210 re-configures cable modems i=1, 2, 3, 4 so that the CMTS unit 210 input level from each cable modem is substantially similar to each other. In present example, the transmission levels of the modems 302a-d are set to TxL$_1$=105 dBuV, TxL$_2$=107 dBuV, TxL$_3$=110 dBuV, TxL$_4$=110 dBuV, respectively. As a result, the Signal-to-Noise ratio (S/N) improves by +10 dB.

FIG. 5B shows actual power measurements taken from the cable modems 302, after the Signal-to-Noise ratio (S/N) is improved.

FIGS. 3A-B, 4A-B and 5A-B are merely examples, which should not unduly limit the scope of the claims herein. A person skilled in the art will recognize many variations, alternatives, and modifications of embodiments of the present disclosure.

Figure 6:
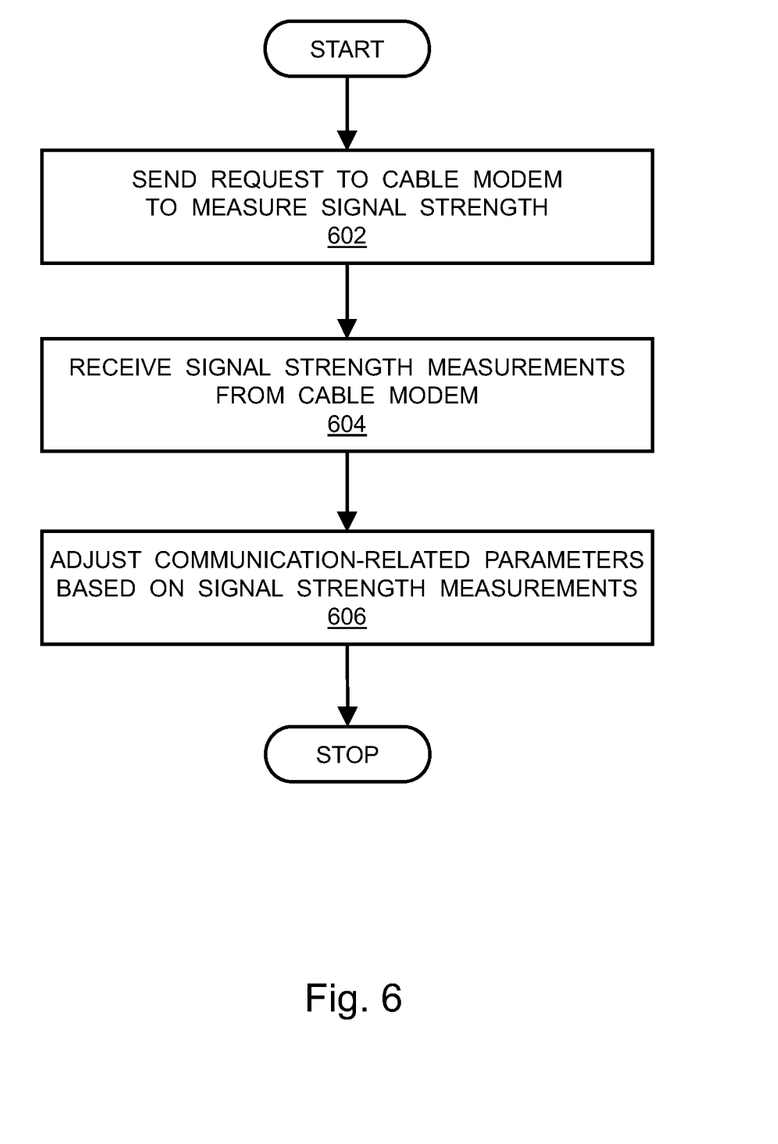
FIG. 6 is an illustration of steps of a method of configuring one or more communication-related parameters in a cable modem system, via the apparatus, in accordance with an embodiment of the present disclosure.

FIG. 6 is an illustration of steps of a method of configuring one or more communication-related parameters in a cable modem system, via an apparatus, in accordance with an embodiment of the present disclosure. The method is depicted as a collection of steps in a logical flow diagram, which represents a sequence of steps that can be implemented in hardware, software, or a combination thereof.

At step 602, the apparatus sends a request to at least one cable modem to measure a signal strength of a signal received by the at least one cable modem.

At step 604, the apparatus receives one or more signal strength measurements from the at least one cable modem.

Subsequently, at step 606, the apparatus adjusts the one or more communication-related parameters to be used for communication with the at least one cable modem.

In accordance with the step 606, the one or more communication-related parameters are adjusted based at least partially on the one or more signal strength measurements received at the step 604. The adjustment is done preferably after making at least two measurements as in step 606.

The step 606 is performed automatically. Optionally, the steps 602 to 606 are performed automatically.

The steps 602 to 606 are only illustrative and other alternatives can also be provided where one or more steps are added, one or more steps are removed, or one or more steps are provided in a different sequence without departing from the scope of the claims herein.

The invention claimed is:

1. An apparatus comprising:
    a processor;
    an attenuator;
    a cable modem termination system (CMTS) unit for providing access to a communication network; and
    a memory coupled to the processor, the memory storing a first computer-readable program code that, when executed on the processor, is configured to operate the CMTS unit to receive current transmission level of one or more cable modems, determine one or more transmit level margins of the one or more cable modems, select smallest one of the transmit level margins of the one or more cable modems and use the selected transmit level margin of the one or more cable modems to derive an attenuation value to automatically adjust the attenuator of the apparatus to attenuate a signal received by the apparatus from the one or more cable modems.

2. A method for improving signal to noise ratio in a cable modem system, via an apparatus, the method comprising:
    receiving, via a cable modem termination system (CMTS) unit of the apparatus, current transmission level of one or more cable modems,
    determining one or more transmit level margins of the one or more cable modems;
    selecting smallest one of the transmit level margins of the one or more cable modems;
    using the selected transmit level margin of the one or more cable modems to derive an attenuation value; and
    adjusting automatically an attenuator of the apparatus, by the attenuation value, to attenuate a signal received by the apparatus from the one or more cable modems.

3. The method according to claim 2, wherein the attenuation value for the attenuator is between 50% and 200% of the selected transmit level margin.

4. The method according to claim 2, wherein the attenuation value for the attenuator is between 80% and 150% of the selected transmit level margin.

5. The method according to claim 2, wherein the attenuation value for the attenuator is between 90% and 110% of the selected transmit level margin.

6. The method according to claim 2, wherein the transmit level margin is determined by comparing a potential maximum transmit level of a modem with a current transmission level of the modem.

7. The method according to claim 2, wherein the selected transmit level margin is selected from a group consisting of at least two transmit level margins.

* * * * *